April 18, 1933. W. A. KOSKEN 1,903,820
PRISM CARRIER FOR PROJECTION MACHINES
Filed Oct. 30, 1929 3 Sheets-Sheet 1
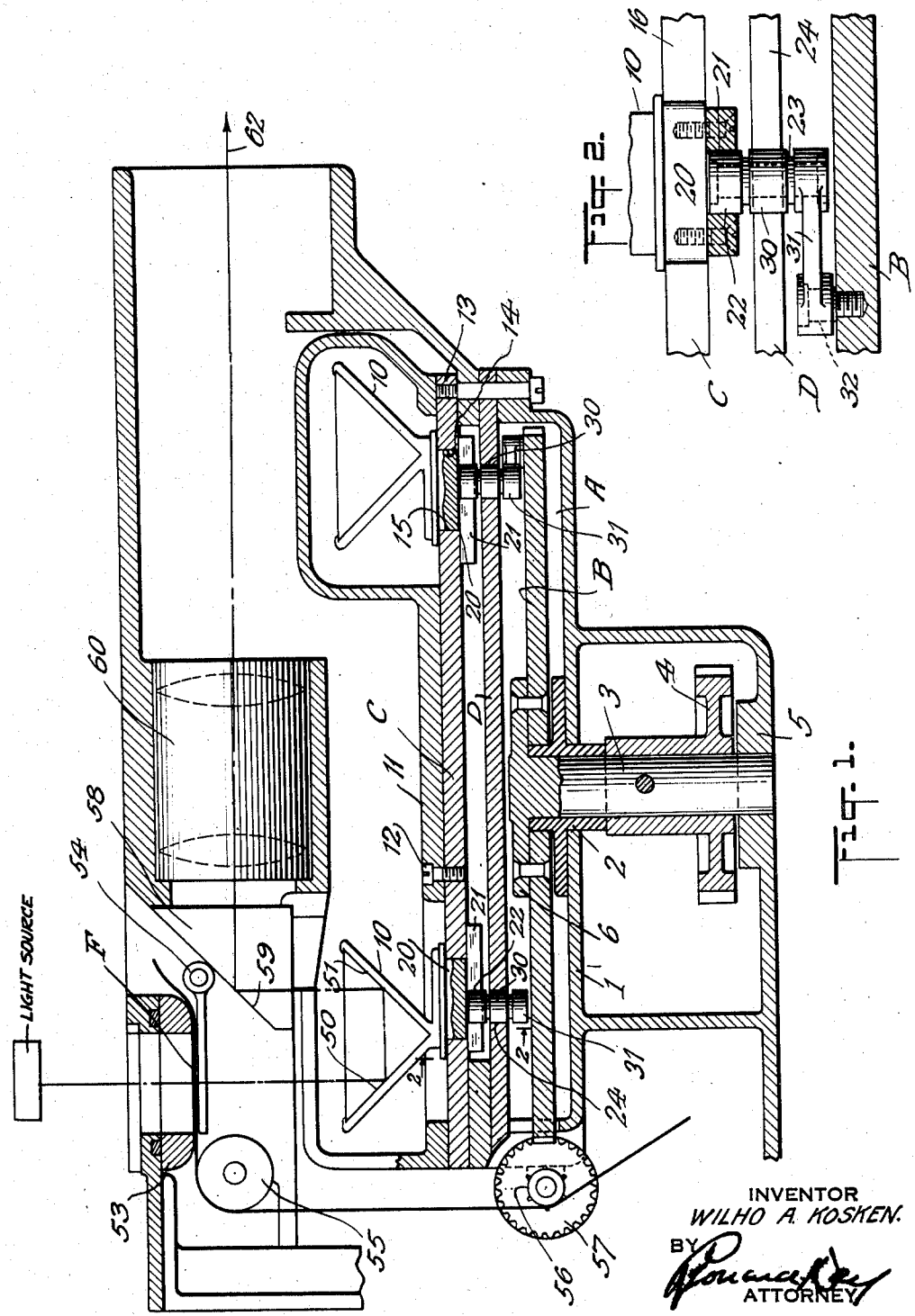
INVENTOR
WILHO A. KOSKEN.
BY
ATTORNEY

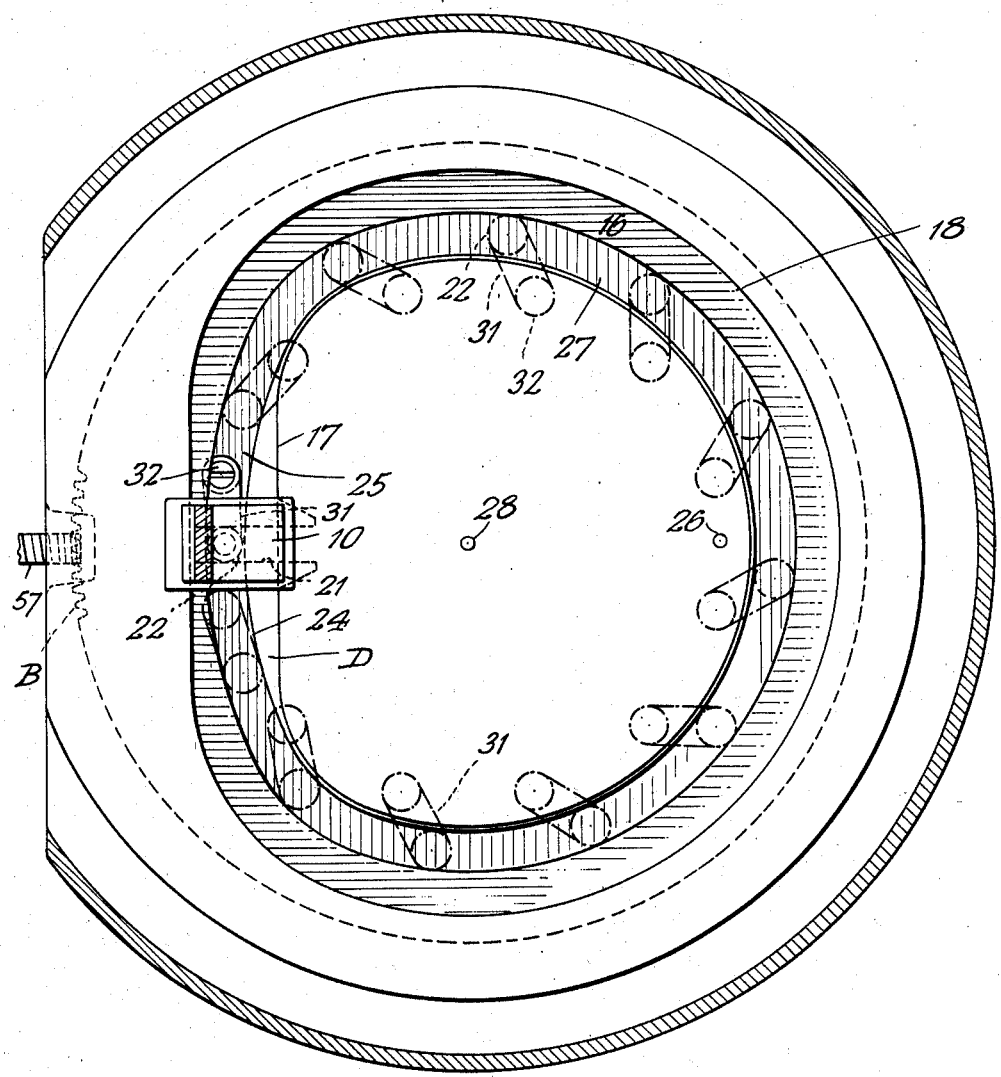

April 18, 1933.  W. A. KOSKEN  1,903,820
PRISM CARRIER FOR PROJECTION MACHINES
Filed Oct. 30, 1929   3 Sheets-Sheet 3
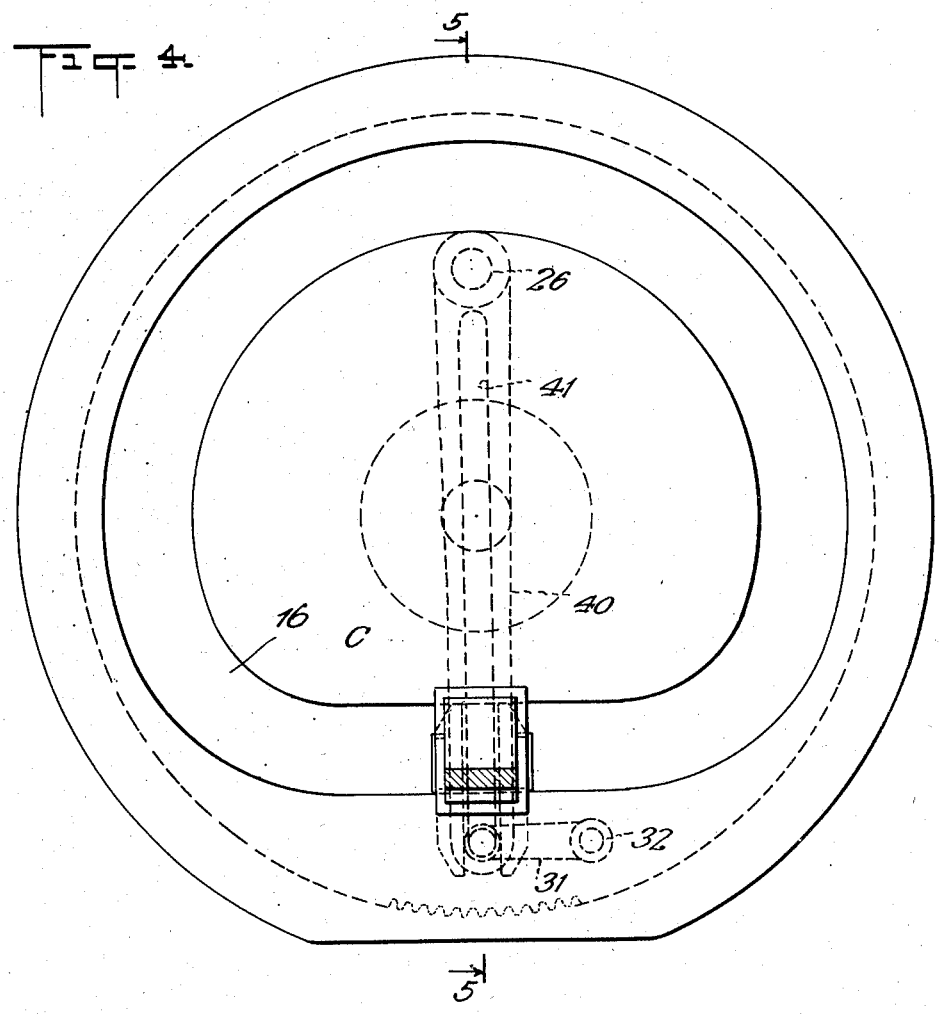
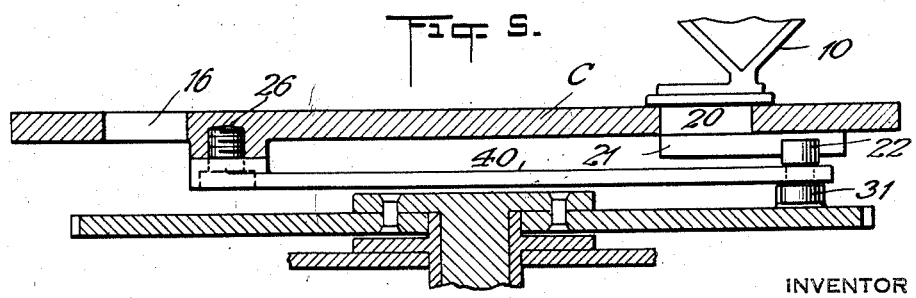
INVENTOR
WILHO A. KOSKEN.
BY
Leonard Day
ATTORNEY Patented Apr. 18, 1933

1,903,820

UNITED STATES PATENT OFFICE

WILHO A. KOSKEN, OF NEW YORK, N. Y., ASSIGNOR TO WILHO A. KOSKEN, INC., A CORPORATION OF NEW YORK

PRISM CARRIER FOR PROJECTION MACHINES

Application filed October 30, 1929. Serial No. 403,491.

This invention relates to motion picture machines in which images are to be recorded upon or to be projected upon a continuously moving film and applies therefore to both projectors and to cameras. A machine of the type to which I refer is set forth in my copending application entitled "Moving picture apparatus", Serial No. 344,666 of March, 1929.

In this copending application I have described an endless series of moving deflectors moved to intercept the image carrying light beam for the purpose of compensating the continuous movement of the film and for maintaining a fixed focal distance. In this copending application I have illustrated and described a camway guiding the endless series of deflectors and including a straight portion operative upon the deflectors in connection with their light beam intercepting movement. It is an objective of the present invention to improve and cause the linear rate of movement of the deflectors in their intercepting movement to more nearly approximate a fixed speed ratio relatively to the speed of the film and to attain this object from the impelling operating functioning of a revolving element.

I am aware of the fact that camways theoretically can be cut and formed to conform to any curvature however complex, but in practice in a machine shop it is practically impossible to machine surfaces except in accordance with some simple geometric function such as a straight line path or circular path.

In carrying out the general objects of my invention I propose to construct all the guiding and operating mechanism for my deflectors so as to employ solely combinations of circular and straight line movements and guiding means so shaped or functioning.

In carrying out my invention, I provide a series of carriages, one each for a deflector, constrained to move in an endless cam slot provided in a cam plate mounted parallel to the plane of the light functioning portion of the film. Each carriage is fitted with a cross-slipway in which works a driver free to move along the slipway and therefore cross-wise of the cam way guiding these carriages. For each carriage I employ a revolving element preferably fixed upon a large gear rotating on the main drive shaft about a fixed axis. A short pivoted link pivotally connects each driver with its revolving element so that each driver is constrained to move in the radius of the circle of this link about its revolving element. In mathematically plotting out the instantaneous positions necessary for the drivers to impart a fixed linear speed ratio relatively to the film speed for my deflector carriages, I have discovered that these points plot the arc of a circle, the center of which is fixed and is preferably located back of the axis of revolution for said revolving elements. I have found that I may preferably apply this constraining influence to the drivers by constraining them to move in a cam slot forming an arc of this circle and therefore easy of mechanical construction. I may employ a slotted radius arm, one for each said driver and each having the same fixed center or axis. Thus, in response to the rotation of one of the gears making up the gearing for the machine the desired substantially mathematically perfect rate of linear speed and direction of movement is impartable to my series of deflectors in their intercepting traverse across the image bearing light beam.

Further objects of my invention are to improve the mechanically operating parts of a continuously moving film motion picture machine.

Further features of the invention will be pointed out more particularly in the accompanying claims which are directed to illustrative embodiments of the invention solely for purposes of illustration and not limitation.

In the drawings, Fig. 1 is a vertical section through the machine with parts broken and somewhat diagrammatic in form; Fig. 2 is an enlarged detailed section at right angles to the showing in Fig. 1 on line 2—2 showing the deflector guiding mechanism; Fig. 3 is a plan view at right angles to the showing in Fig. 1 of the deflector guiding mechanism; Fig. 4 is a similar view of a modification;

and Fig. 5 is a sectional view on line 5—5 of the modification of Fig. 4.

A indicates any suitable sectional frame for enclosing the working parts and providing attachments and bearings therefor. It is preferable that it be of cast metal.

The ledge 1 mounts the bearing 2 in which works the drive shaft 3 driven by gear 4 and also steadied in bearing 5. The large gear B is fixed to rotate with shaft 3 by attachment to the cap 6 and is therefore a part constrained to revolve about a fixed axis. The main guiding cam plate for a series of deflectors 10 is indicated by C, the center portion of which may be fixed to ledge 11 by machine screws 12 and the outer portion 13 of which may be fixed directly to the frame. The contiguous edges 14 and 15 of these portions form an endless cam slot 16 having the straight portion 17 and the blending circular portion 18. The portion 18 functions merely to return the deflectors to the beginning of the straight portion 17 which alone functions to guide the deflectors in their intercepting pathway.

Each deflector 10 is provided with a carriage 20 which may have all the detailed adjuncts to cause it to function as a cam follower in the cam slot 16 particularly so that it runs without chatter in the straight portion thereof. Carriage 20 is therefore a part constrained to move in a straight line throughout its operative optical functioning. Fixed to the bottom of each carriage 20 is a slipway 21 formed by two spaced parallel strips extending cross-wise of the cam slot 16 and is shown underlying the cam plate C.

Working snugly in the slipway 21 is a driver 22 carried by stub shaft 23 rotating therein.

Beneath the cam plate C in Figs. 1 and 2 is a second cam plate D providing an endless cam slot 24, one portion 25 of which is a circular arc about the center 26 and the other portion 27 of which is a circular arc about the center 28 which is the axis of shaft 3. The stub shaft 23 carries a cam follower 30 working in cam slot 24.

The bottom end of stub shaft 23 is mounted in the free end of a short link 31 pivoted by bolt 32 to the gear B. It is convenient to describe this bolt as the revolving element and there is, of course, one for each deflector. Twelve deflectors and twelve driving mechanisms are prescribed for the machine of this embodiment.

In the embodiment of Fig. 4 and Fig. 5 only the cam plate C with the cam way 16 is employed. As a substitute for the second cam way D, each driver 22 is slack linked by a radius arm 40 to the center 26, the slot 41 providing for the short radius about the retrieving travel of the drivers. The same slipways 21 are employed and the same links and revolving elements 31 and 32 are employed, all as in the previous figures.

Each deflector 10 provides two reflecting surfaces at right angles to each other 50 and 51 and each at an angle of 45° with the plane of the cam way C and likewise of the film portion F at the locality of the film gate 53.

Suitable idle rollers 54 and 55 guide the film to the operating sprocket 56 which is driven from the gear B by gear 57.

A fixed prism 58 provides the reflecting surface 59 to deflect the image carrying beam through the lens barrel 60 which is to be understood as suitably adjustable and as carrying the desired lenses for the projection of the image beam outwardly in the direction of the arrow 62.

From a suitable source of light the projection beam traverses the film F through film gate 53 and is intercepted by the compensating deflector means 10 and passed upwardly to reflecting surface 59 and thence outwardly for projection purpose. The deflectors 10 one after the other continuously intercept the image carrying beam and by reason of an inclination of the straight portion 17 of the main guiding cam way from a right angle to the plane of the projection beam as shown in Fig. 1 compensate for the continuous travel of the film portion F. The positioning of the reflecting surfaces and the lenses coupled with the guided movement of these deflectors also maintains fixed focal distance.

As to the guiding drive for the deflectors 10, it is to be understood that the drive shaft 3 rotates the gear B at a constant angular velocity and this gear in turn causes a commensurate continuous drive for the film F. Each revolving element 32 is revolved about the axis of shaft 3 at a constant angular velocity. Each link 31 constrains its driver 22 to move solely in the arc of a circle measured by the radius length of link 31 about its revolving element 32 but is always exerting a driving or impelling urge to its carriage 20 through the slipway 21 positioned cross-wise of the cam slot 16. If there were nothing but the link 31 to determine the position of the driver 22 in its slipway 21 a mere balance of forces would be controlling. This, however, is not what is desired. As I have previously explained, each driver 22 must be constrained to move in the path of a circle about the center 26. In Figs. 1, 2 and 3 this is accomplished by causing the second cam follower 30 to be guided in and work in the cam slot 24, which for the desired portion of the travel of its carriage 20, has this circular curvature. In Figs. 4 and 5, however, the constraint to move in the arc of a circle about the axis 26 is accomplished by means of the radius arm 40, the end of which is provided with the slot 41 so that when the driver has its carriage 20 in the portion 18 of cam slot B solely cam portion 18 is functioning and the stub shaft 23 may ride inwardly towards the center 26 through slot 41.

It is generally to be understood that the mechanisms described in connection with this invention are adapted to function in accordance with the invention described more in detail in connection with its optics in my aforementioned copending application, this application having more particularly to do with the deflector guiding mechanism. I desire it to be understood that I have shown the parts herein more with regard to clearness of functioning than with the idea that all details are illustrated. I therefore contemplate as within the scope of my invention as claimed all usual and necessary adjuncts to the parts and assemblage illustrated and described.

What I claim and desire to secure by United States Letters Patent is:

1. In a mechanical movement for transforming part of an angular rotation into a linear translation so that the linear velocity bears a fixed ratio to the angular velocity comprising a part constrained to revolve about a fixed axis; a part constrained to move in a straight line; a cross-slipway fixed to said part constrained to move in a straight line; a driver operatively working in said slipway; a link maintaining said driver at a fixed radial distance from said part constrained to revolve about a fixed axis; and additional guiding means restraining said driver at a fixed radial distance from a center fixed relatively to the axis of revolution of said revolving part and more distant from said part restrained to move in a straight line.

2. In mechanism for driving a carrier along a straight line pathway at a fixed linear speed ratio relatively to the angular speed of revolution of a revolving element comprising a carrier; a straight line guideway therefor; a revolving element constrained to revolve in a plane parallel to said straight line guideway; means for mechanically connecting said revolving element with said carrier comprising a driver; means for limiting the movement of said driver to a circle about said revolving element in a plane parallel to its circle of revolution; and means constraining said driver to a movement throughout the extent of its optically functioning movement in the arc of a circle, the plane of which is also parallel to the plane of revolution of said revolving element and the center of which is fixed relatively to the axis of revolution of said revolving element.

3. A motion picture machine in which a series of images are to be recorded upon or to be projected from a continuously moving film comprising mechanical driving mechanism including rotating sprockets, gearing, and a rotatable drive shaft; means for carrying a series of deflectors in a straight line pathway at a substantially fixed ratio of linear velocity relatively to the linear velocity of said film embodying a series of carriages therefor; a closed path cam way for guiding said carriages including a straight portion; a revolving element constrained to revolve in a plane parallel to said straight portion; a cross-slipway fixed to each said carriage; an operating driver working in said slipway; a link rotatably connected at its ends respectively to said revolving element and said driver; and means for constraining said driver to move when its corresponding carriage is in its straight portion at a fixed radial distance from a center fixed relatively to the axis of revolution of said revolving element and more distant from said straght portion.

4. A motion picture projecting machine comprising a drive shaft; sprockets and gearing for moving a film continuously; a film gate for forming a flat projection portion for said film; a source of light and optical means for projecting an image carrying light beam, the axis of which is in a plane at right angles to the film portion at said film gate and is later deflected into parallelism with the direction of movement of said portion, includng a series of movable light beam deflectors intercepting said light beam and compensated for the continuous linear image travel of said images and maintaining a constant focal distance in which the operating mechanism for said series of deflectors comprises a closed cam way having a straight portion, a revolving element, a carriage for each deflector working in said cam way, a cross-slipway for each said carriage, a driver for each slipway, an end pivoted link between each driver and its revolving element, and means for maintaining each driver at a fixed radial distance from a center fixed relatively to the axis of revolution of its revolving element when the carriage is in its said straight portion of said closed cam way.

WILHO A. KOSKEN.